(12) United States Patent
Chute

(10) Patent No.: US 9,538,341 B1
(45) Date of Patent: Jan. 3, 2017

(54) PUSH-TO-TALK CLIP SYSTEM

(71) Applicant: Matbock LLC, Virginia Beach, VA (US)

(72) Inventor: Gregory Chute, Virginia Beach, VA (US)

(73) Assignee: Matbock, LLC, Virginia Beach, VA (US)

( * ) Notice: Subject to any disclaimer, the term of this patent is extended or adjusted under 35 U.S.C. 154(b) by 307 days.

(21) Appl. No.: 14/090,611

(22) Filed: Nov. 26, 2013

Related U.S. Application Data

(60) Provisional application No. 61/729,874, filed on Nov. 26, 2012.

(51) Int. Cl.
*H04W 4/10* (2009.01)

(52) U.S. Cl.
CPC ............ *H04W 4/10* (2013.01); *Y10T 24/1394* (2015.01); *Y10T 24/2708* (2015.01)

(58) Field of Classification Search
CPC .......... Y10T 24/44966; Y10T 24/2708; Y10T 24/3938; Y10T 24/1394; Y10T 24/13; Y10T 24/1391; Y10T 24/1321; Y10T 24/203; Y10T 24/205; Y10T 24/206; Y10T 24/3428; Y10T 24/44017; Y10T 24/44291; Y10T 24/44376; Y10T 24/444564; Y10T 24/4465; Y10T 24/44684; Y10T 24/44769;Y10T 24/44778; Y10T 24/44786; Y10T 24/44932; Y10T 24/304; Y10T 24/306; Y10T 24/309; H04W 4/10; A45F 5/02; A45F 5/00
USPC ............................................... 248/690, 205.2
See application file for complete search history.

(56) References Cited

U.S. PATENT DOCUMENTS

| 296,022 | A | * | 4/1884 | Langerfeld | A45F 5/02 24/3.12 |
|---|---|---|---|---|---|
| 4,897,898 | A | * | 2/1990 | Chapin | A45F 5/02 24/3.12 |
| 8,175,314 | B1 | * | 5/2012 | Webster | H04R 1/028 381/122 |
| 2008/0190975 | A1 | * | 8/2008 | Naughton | A45F 5/02 224/269 |
| 2014/0325794 | A1 | * | 11/2014 | Merton | H04R 1/08 24/3.12 |

* cited by examiner

*Primary Examiner* — Robert J Sandy
*Assistant Examiner* — Michael Lee
(74) *Attorney, Agent, or Firm* — Middleton Reutlinger; Alexander P. Brackett

(57) ABSTRACT

The present invention comprises a holster for securing a PTT switch to a user that employs a single piece body having opposed top and bottom sides connected by a generally curved side to define a switch chamber. The invention further includes a portion of hook-and-loop fabric secured to the bottoms side for engaging a complementary fabric and a protective tab extending outwardly from said top side for protecting the PTT switch from inadvertent activation.

5 Claims, 5 Drawing Sheets

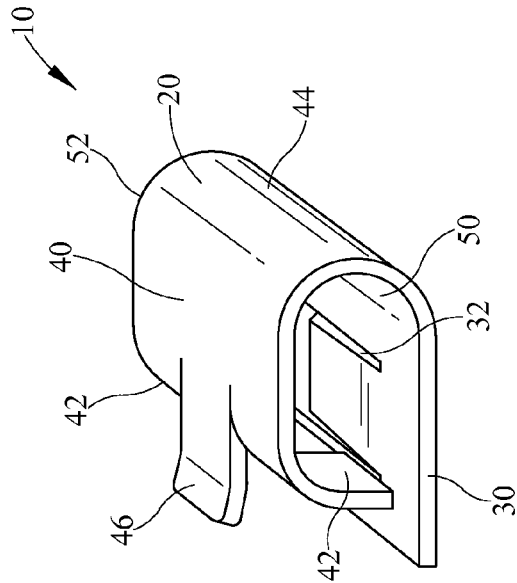
FIG. 1
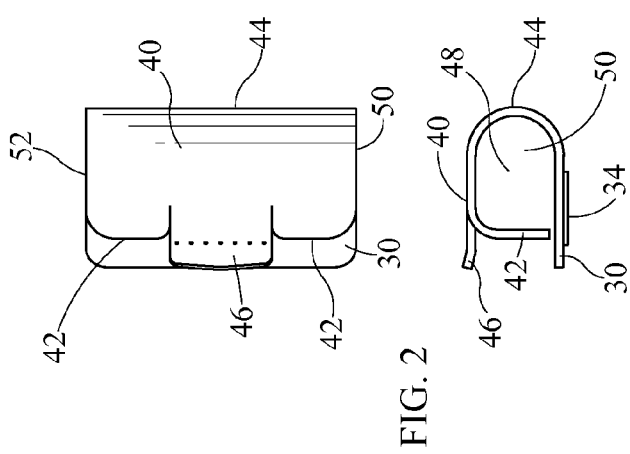
FIG. 2
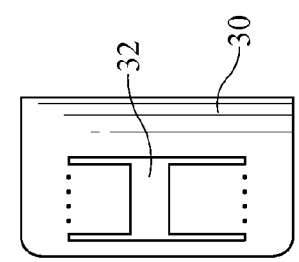
FIG. 3
FIG. 4

PUSH-TO-TALK CLIP SYSTEM

CROSS-REFERENCE TO RELATED APPLICATIONS

This application claims the benefit of U.S. Provisional Patent Application Ser. No. 61/729,874 filed Nov. 26, 2012 and entitled "Push-To-Talk Clip System".

FIELD OF THE INVENTION

The present invention relates generally to a clip system and more particularly to a semi-rigid holster adapted to be used with a push-to-talk (PTT) communications system that is capable of being secured to a user's gear in right-handed or left-handed fashion.

BACKGROUND OF THE INVENTION

Prior art push-to-talk mobile communication systems (hereinafter 'PTT") commonly utilized by the U.S. Military are typically equipped with holsters or holders that envelop and support a PTT switch. PTT switches permit a user to depress a pushbutton to open a "live microphone" to talk to others similarly equipped and operating on the same communications channel. These PTT holsters are usually equipped with a conventional metal clip that is snapped or secured to a user's gear at a location that permits quick access to the PTT switch. Simultaneously, these PTT holsters must protect the switch from inadvertent activation, which may leave a "hot mic" at inopportune moments.

These prior art PTT systems suffer from several disadvantages. Initially, the clips used to secure PTT holsters to a users' gear are not configured to permit the user to secure the holster on either side of their person. For example, most clips are "alligator" type clips configured to clip the holster to a user's right side and don't have any provision for left-handed mounting. As a result, many military personnel simply remove the standard clips and use zip-ties or rubber bands to secure the PTT holster to their gear at an advantageous location.

Additionally, once conventional holsters are secured to gear, either using the standard clips or via zip-ties or rubber bands, it is cumbersome to relocate the PTT holster should it become necessary since they are more or less permanently secured to the gear. In many applications, the user would prefer to mount the PTT switch and holster in an orientation that is simply not possible when using prior art holsters and clips.

Accordingly, based on the foregoing it is readily seen that there is a significant need in the art for a PTT holster for securing a PTT switch to a user or his gear that is readily properly oriented in a plurality of locations, simple to deploy, and quick to secure that overcomes the problems abundantly apparent in the prior art.

BRIEF DESCRIPTION OF THE DRAWING FIGURES

FIG. 1 is a perspective view of a PTT holster in accordance with one embodiment of the present invention.

FIG. 2 is a top view of a PTT holster in accordance with one embodiment of the present invention.

FIG. 3 is a side view of a PTT holster in accordance with one embodiment of the present invention.

FIG. 4 is a bottom view of a PTT holster in accordance with one embodiment of the present invention.

DETAILED DESCRIPTION OF THE PREFERRED EMBODIMENT(S)

Figure 5:
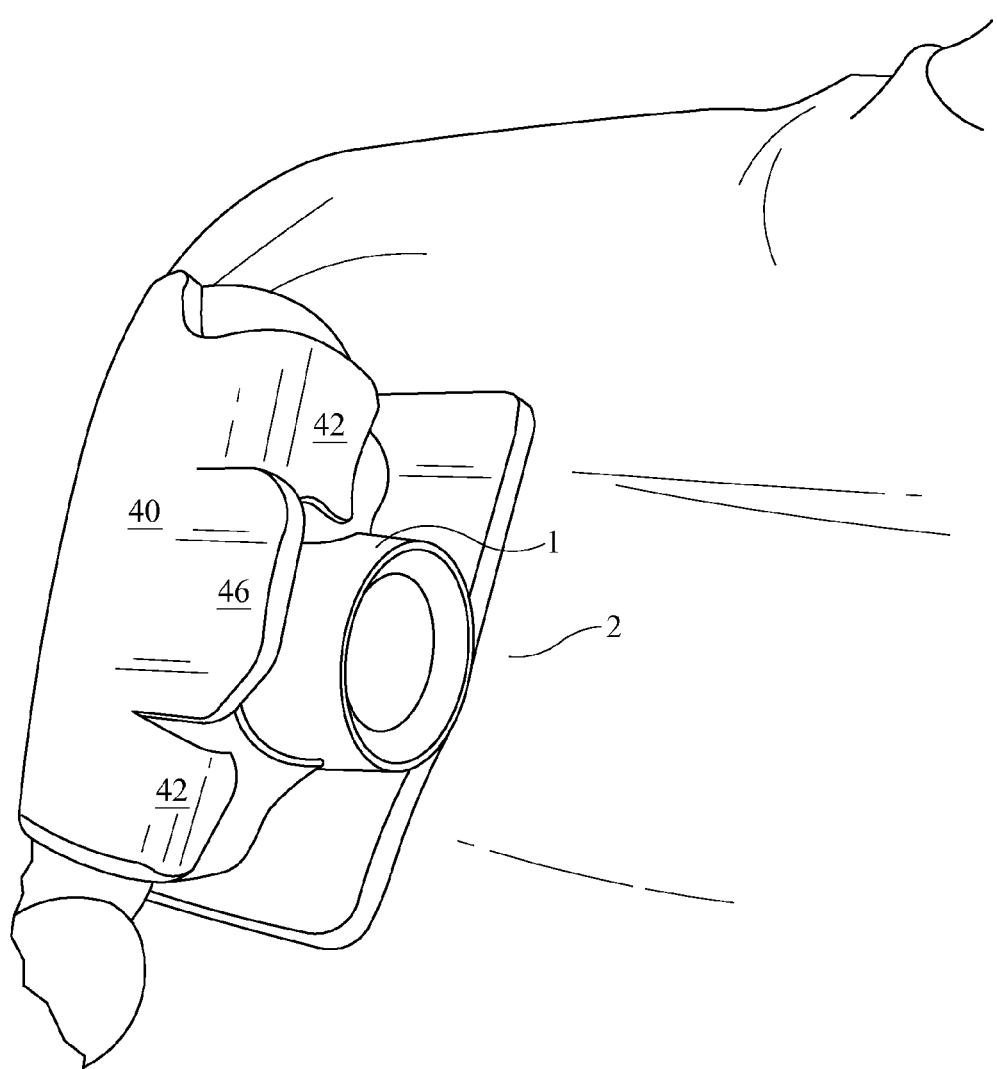
FIG. 5 is a perspective view of a PTT holster with a PTT switch installed in accordance with one embodiment of the present invention.

Referring now to FIGS. 1-8, and in accordance with a preferred constructed embodiment of the present invention, a PTT holster system 10 for securing a PTT switch 1, or the equivalent thereof, to a user comprises a single-piece body 20 having base 30 that is generally flat in construction and, in one embodiment of the invention, may include a shaped slot 32 therein to which a conventional clip may be secured, or through which a flexible fastener—for example zip-ties—may be routed.

Base 30 may further include a hook-and-loop (Velcro®) portion covering the bottom of body 20, thereby providing a mechanism for securing holster 10 to a complementary hook-and-loop (Velcro)® surface, or alternatively to Molle equipment or the equivalent thereof. Molle is an acronym for "Modular Lightweight Load-carrying Equipment". It is often used in the vernacular to define the current generation of load-bearing equipment utilized by the United States armed forces especially the United States Army. The system's modularity is derived from the use of "PALS" webbing, rows of heavy-duty nylon stitched onto a vest to allow for attachment of various MOLLE-compatible pouches and accessories. This feature of the invention provides a user the ability to orient holster 10 at virtually any desired angle or location, without the use of clips or other mechanical apparatus. Furthermore, holster 10 can readily and quickly be relocated to another location should the user desired to do so.

Holster 10 body 20 may be formed of a variety of resilient and durable materials that are capable of retaining their shape after deformation. In one embodiment to the invention holster 10 body 20 is comprised of Kydek® material. Alternatively, a variety of thermoplastic materials having properties similar to Kydek® may be used in the manufacture of holster 10 without departing from the scope of the instant invention. Additionally, many known thermoplastic materials are capable of being formed using camouflage coloring, thereby enabling the holster 10 body to mask the PTT switch, which is typically provided only in single colors, most often black.

Referring again to FIGS. 1-5, body 20 further comprises a top side 40, spaced from base 30, and a pair of opposed open ends 50, 52 through which PTT switch 1 may be inserted. Top side 40 includes a pair of curved portions 42 that terminate proximate base 30. Top side 40 and base 30 are connected by a continuous side 44, generally shown as a curved side 44. Curved portions 42, top side 40, continuous side 44 and base 30 combine to form a switch chamber 48 that may be sized to closely engage a PTT switch 1 of a predetermined size as it is inserted into either open end 50, 52 of holster 10 body 20. Since these aforementioned elements of body 20, in one embodiment of the invention, are comprised of a deformable but resilient material, they are free to deform slightly when PTT switch 1 is pushed into place, and will naturally retain their original shape one PTT switch 1 is removed.

A PTT switch protective tab 46 extends outwardly from top side 40 between curved portions 42 to protect PTT switch 1 from inadvertent activation. As can be readily seen in FIG. 3, in one embodiment of the present invention both switch protective tab 46 and base 30 extend outwardly to one side of body 20 past curved portions 42 to protect PTT switch 1 from inadvertent activation.

Referring now to FIGS. 5-8, in operation, base 30 Velcro® 34 can be secured to a wide variety of fabrics and gear materials, including a Molle vest 2, by simply pressing the base 30 into the material. Furthermore, since in this embodiment of the invention no clips are used to secure holster 10 to a user, it may be arranged in any orientation the user wishes, either on the right or left as necessary. This feature of the instant invention is an important advantage over the prior art, which usually forces users to place PTT switch 1 on the right side of their person. Additionally, since holster 10 includes a pair of opposed open sides 50, 52, the wire leading away from PTT switch 1 can be arranged to exit holster 10 at a location that facilitates its routing.

Figure 6:
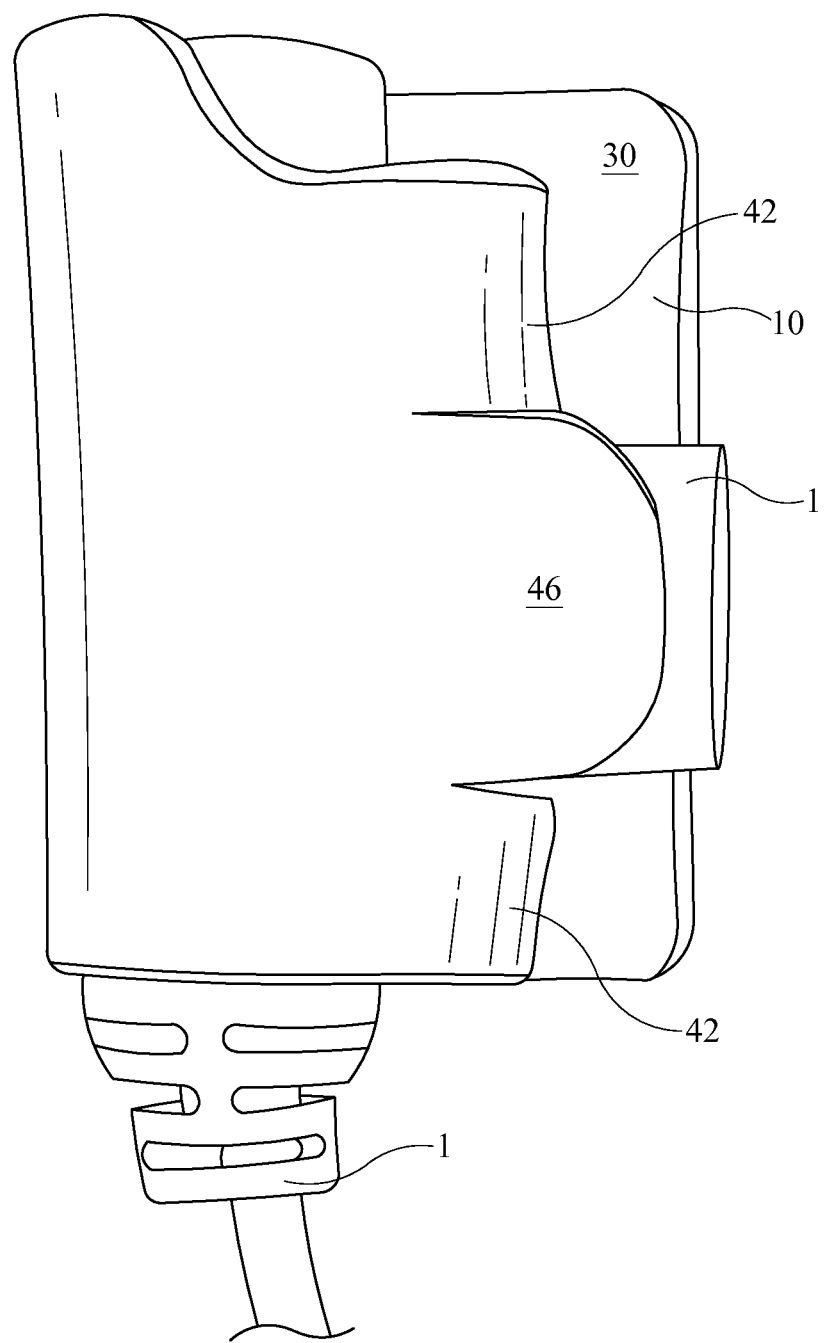
FIG. 6 is a perspective view of a PTT holster with a PTT switch installed in accordance with one embodiment of the present invention.
Figure 7:
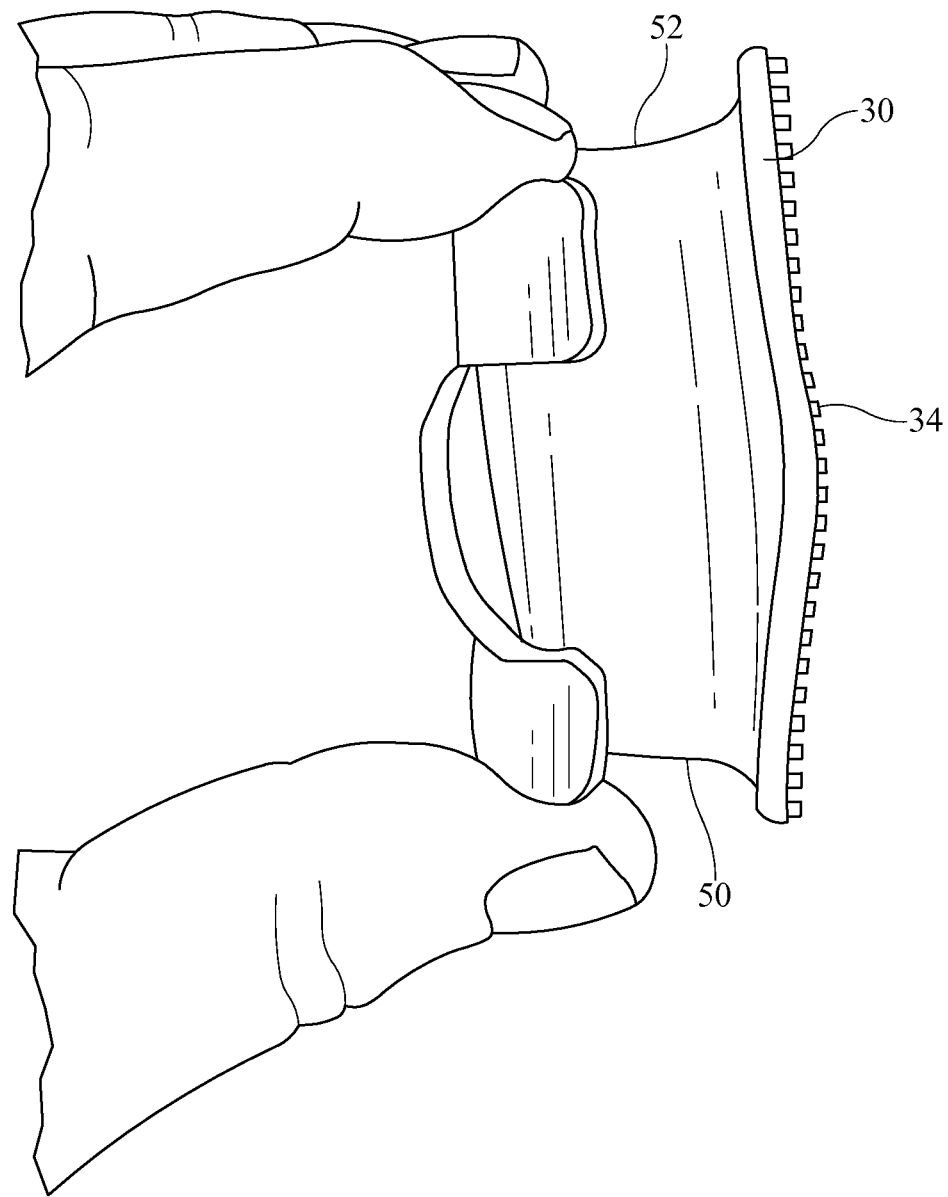
FIG. 7 is a side view of a PTT holster in accordance with one embodiment of the present invention.
Figure 8:
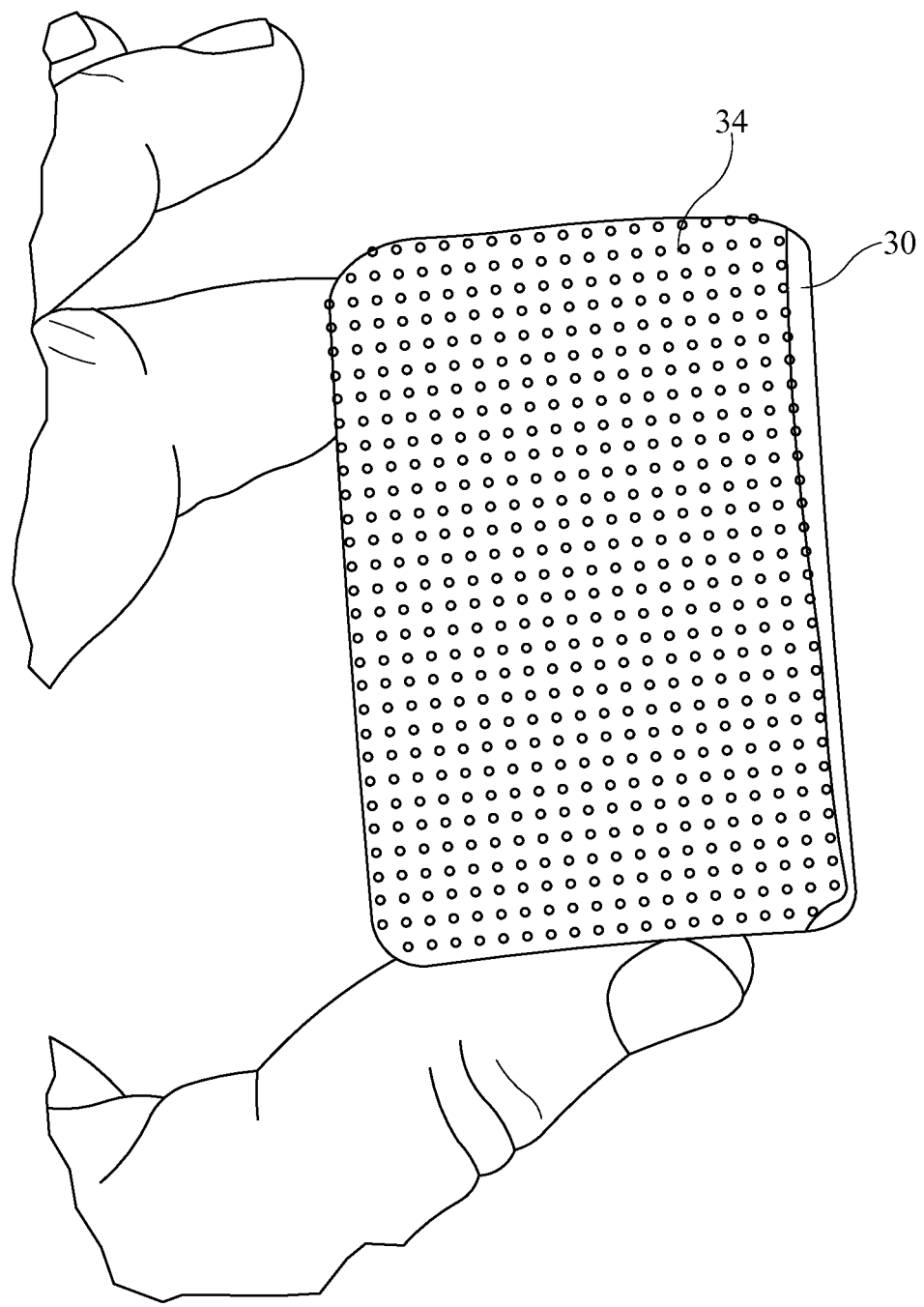
FIG. 8 is a bottom view of a PTT holster in accordance with one embodiment of the present invention.

FIGS. 5 and 6 depict a PTT switch 1 installed in holster 10, wherein protective tab 46 extends outwardly beyond switch 1, thereby preventing inadvertent activation of switch 1. Additionally, holster 10 may utilize a conventional clip (not shown) to engage slot 32, whereby the clip can be secured to a user a desired location. Slot 32 may be also used to route a zip-tie or similar flexible fastener to secure holster 10 in a desired location.

The foregoing detailed description of the embodiments of the invention is presented primarily for clearness of understanding and no unnecessary limitations are to be understood or implied therefrom. Modifications to the present invention in its various embodiments will become obvious to those skilled in the art upon reading this disclosure and may be made without departing from scope of the invention and the claims appended hereto.

I claim:

1. A holster for securing a PTT switch to a user comprising:
   a single piece body having opposed top and bottom sides connected by a generally curved side to define a switch chamber, said bottom side including a portion of hook-and-loop fabric secured thereto for engaging a complementary fabric;
   a pair of curved portions extending from said top side and terminating proximate said bottom side; and
   a protective tab extending outwardly from said top side between said pair of curved portions for protecting said PTT switch from inadvertent activation.

2. A system for securing a PTT switch to a user as claimed in claim 1 comprising:
   a slot disposed in said bottom side for engaging a fastener.

3. A system for securing a PTT switch to a user as claimed in claim 1 wherein said body comprises a thermoplastic resin.

4. A system for securing a PTT switch to a user as claimed in claim 1 wherein said body comprises Kydek material.

5. A system for securing a PTT switch to a user as claimed in claim 1 wherein said switch chamber is sized to expand when a PTT switch of a predetermined size is inserted therein.

* * * * *